United States Patent
Havluciyan

(10) Patent No.: US 8,656,863 B2
(45) Date of Patent: *Feb. 25, 2014

(54) PET POTTY

(76) Inventor: Mikael Havluciyan, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/571,351

(22) Filed: Aug. 10, 2012

(65) Prior Publication Data

US 2012/0298046 A1 Nov. 29, 2012

Related U.S. Application Data

(63) Continuation of application No. 11/972,094, filed on Jan. 10, 2008.

(51) Int. Cl.
*A01K 29/00* (2006.01)

(52) U.S. Cl.
USPC .......................................... 119/165; 119/166

(58) Field of Classification Search
USPC ................. 119/161, 165, 166, 479, 167, 170, 119/452, 459, 471, 480; 4/245.1, 245.4, 4/245.6
IPC ...................................................... A01K 29/00
See application file for complete search history.

(56) References Cited

U.S. PATENT DOCUMENTS

| | | | | |
|---|---|---|---|---|
| 3,818,865 A * | 6/1974 | Sinclair | .......................... | 119/161 |
| 3,921,582 A * | 11/1975 | Sedlmeir | ....................... | 119/161 |
| 4,048,960 A * | 9/1977 | Barnidge et al. | ............... | 119/529 |
| 4,250,834 A * | 2/1981 | Cheselka | ........................ | 119/169 |
| 5,148,771 A * | 9/1992 | Schuett et al. | ................. | 119/479 |
| 5,211,133 A * | 5/1993 | Foley | .............................. | 119/166 |
| 5,293,837 A * | 3/1994 | Caldwell | ........................ | 119/166 |
| D351,694 S * | 10/1994 | Evans | ........................... | D30/161 |
| 5,355,837 A * | 10/1994 | Reyes | ............................. | 119/161 |
| 5,813,365 A * | 9/1998 | Helmy | ............................ | 119/528 |
| 5,862,779 A * | 1/1999 | Kleinsasser | .................... | 119/529 |
| 6,079,363 A * | 6/2000 | MacLaine | ....................... | 119/161 |
| 6,095,235 A * | 8/2000 | Kongsgaard | ..................... | 165/56 |
| 6,941,894 B2 * | 9/2005 | Scotto D'Anielo | ............ | 119/166 |
| 7,066,111 B2 * | 6/2006 | McGregor | ....................... | 119/509 |
| 7,096,823 B1 * | 8/2006 | Smeltzer | ........................ | 119/166 |
| 7,243,612 B2 * | 7/2007 | Costa | ............................. | 119/161 |
| 2002/0000205 A1 * | 1/2002 | Yamamoto | ..................... | 119/161 |
| 2006/0037549 A1 * | 2/2006 | Kim | ................................ | 119/166 |
| 2006/0156992 A1 * | 7/2006 | Costa | ............................. | 119/161 |
| 2007/0113793 A1 * | 5/2007 | Kurahashi et al. | ............. | 119/479 |
| 2008/0035069 A1 * | 2/2008 | Yamamoto et al. | ........... | 119/169 |
| 2008/0105207 A1 * | 5/2008 | Gloor | ............................. | 119/161 |
| 2008/0105208 A1 * | 5/2008 | Hamrick | ......................... | 119/165 |
| 2009/0000557 A1 * | 1/2009 | Takahashi et al. | ............. | 119/161 |

FOREIGN PATENT DOCUMENTS

JP 2005287367 A * 10/2005
WO WO 2007094029 A1 * 8/2007

* cited by examiner

*Primary Examiner* — Shadi Baniani

(57) ABSTRACT

A pet potty includes a base plate and a grid. The base plate has a base and a wall along the perimeter of the base, the base and wall impermeable to fluid and forming a cavity capable of retaining fluid. The grid is sized to fit within the cavity of the base plate and has a complex of beams that can support a pet atop the grid. The beams have a top side and a bottom side, and substantially all of the beams are convex in shape on their top side.

11 Claims, 8 Drawing Sheets

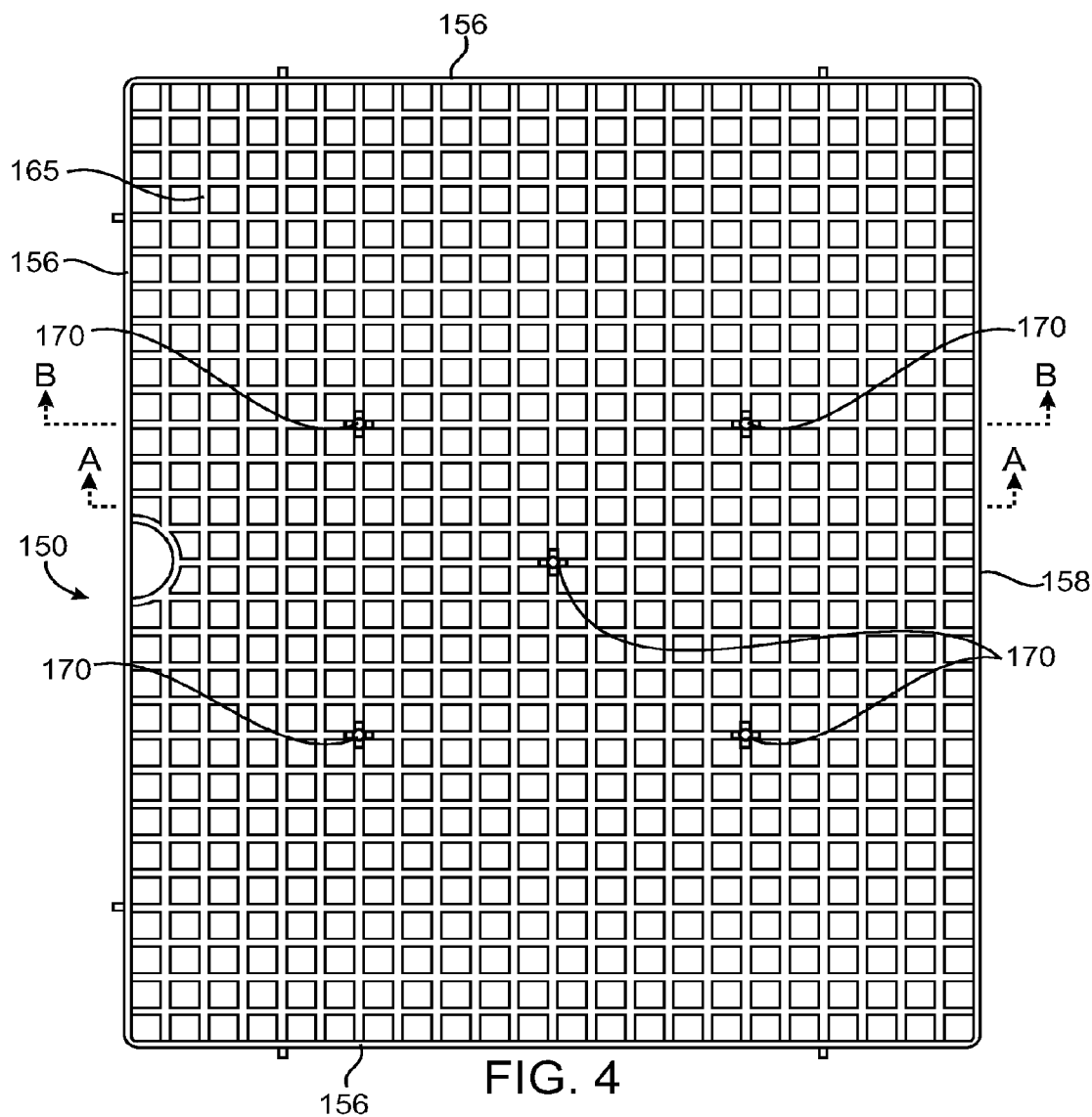
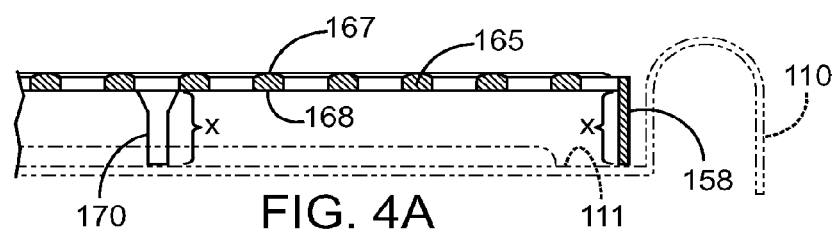
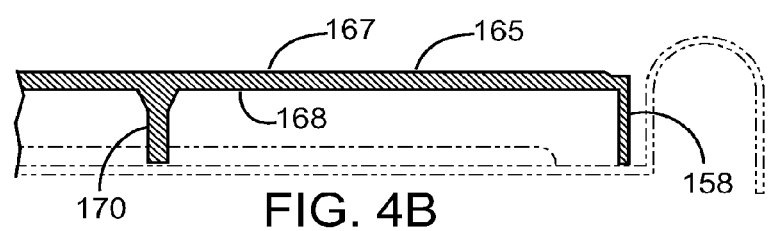

PET POTTY

RELATED APPLICATIONS

This is a continuation of U.S. application Ser. No. 11/972,094, filed Jan. 10, 2008, the entirety of which is incorporated herein by reference. This application claims priority from U.S. application Ser. No. 11/972,094.

FIELD OF THE INVENTION

Generally, the invention relates to litter boxes for pets. More specifically, the invention relates to litter boxes that can be used by dogs as well as cats and that does not require the use of traditional cat litter material.

BACKGROUND

The following description provides a summary of information relevant to the present invention. It is not an admission that any of the information provided herein is prior art to the presently claimed invention, nor that any of the publications or devices specifically or implicitly referenced are prior art to that invention.

Cat litter boxes have been in general use by the public for quite some time, and there are many types from which to choose. Generally, the traditional cat litter box is a rectangular container with raised walls on three sides and a lowered wall on the entry side where the cat enters the container. The traditional container holds cat litter material, which is used to attract the cat and absorb cat feces and urine odor. This has worked well for cats, but has not generally been adopted for use by dogs.

Dogs have traditionally had few options when it comes to relieving themselves indoors. Traditionally, dogs tended to live outdoors and were free to relieve themselves in outdoor areas. More recently, dog owners have been bringing their dogs indoors for several reasons. One reason is that smaller breed dogs have become increasingly popular, and these breeds are suited for indoor living. In fact, they tend to prefer living indoors in close relationship with their owners.

Another reason for this shift in the living relationship between dogs and humans is that more and more people have been moving into smaller dwelling units that do not have back yards, or have very small outdoor spaces. This shift from traditional homes with yards to smaller homes, such as condos, townhomes and apartments has not reduced people's desire to share their lives with pets. Instead, it has created a greater demand for products that enable indoor living for pets, particularly dogs. Thus, there is now a particular need for products and services that allow pet owners to potty train their pets. There is a corresponding need for indoor pet potties, particularly those suitable for use by dogs.

As explained above, cats presently have many options that involve using cat litter inside of some form of cat litter box indoors. Dogs, however, have just a few options when it comes to housebreaking and using the bathroom indoors.

One option is to use a litter box with litter in a manner very similar to what cats use. The problem with such litter boxes for dogs is that dogs like to bury their waste, which results in litter being flung all over the room in which the litter box is placed. In addition, puppies, and some dogs, tend to eat the litter, which is very unhealthy and can lead to serious digestive and other health problems.

Another option is to lay newspaper or other suitable paper product on the floor and housetrain the dog to use it exclusively. The problem with such an approach is that most paper products don't absorb urine very well, and they tend to leak through to the floor. Moreover, dogs tend to step in the urine on the newspaper and track it all over the house with their paws. Another problem is that puppies tend to tear the paper into shreds and create a big mess all over the house.

To address these deficiencies in newspaper use, absorbent pads have been created. These pads tend to have one or more layers of absorbent material and a backing layer of material that is impervious to fluid so as to prevent urine from leaking through to the floor beneath the pad. The problem with these absorbent pads, however, is threefold: (1) puppies tend to tear them to shreds as they do with paper products; (2) in their attempt to bury their waste dogs tend to fling the pads out of position and scatter them around so that they are not useful after one use; and (3) the pads do not absorb the urine quickly enough so that dogs tend to track the urine around the house with their paws after stepping in it just after urinating.

Another solution has been to use large crates that house artificial grass or real sod that is periodically replaced. There are several companies that make various versions of such a product. The problems with that solution are threefold: (1) the artificial grass or sod must be replaced every week or two weeks at most, and even then there is a buildup in odor; (2) these crates tend to be very expensive and can cost between $150 to $600 just for the crate and the first installation of sod; and (3) the replacement sod or grass is also very expensive and results in recurring costs over the entire lifetime of the product.

Another solution has been the creation of an indoor dog potty that can hold absorbent pads or newspapers in a manner inaccessible to dogs. One such type of dog potty is made of a rectangular base plate fitted with a unitary removable grid. The base plate can hold a newspaper or absorbent pad inside with the grid placed atop the newspaper or absorbent pad. The dog goes to the bathroom atop the grid and the pee passes through the grid to the newspaper or absorbent pad below. The problem with such a product is that the unitary grids tend to be large and difficult to handle and clean. In addition, the grids are often made from lighting louver material or other material and may not be suited for all dogs' paws.

Thus, there is a need for an affordable, safe, convenient, and clean pet potty that can be used to housetrain pets and provide them with a means to relieve themselves indoors. The present invention solves all of the aforementioned problems associated with current housetraining and indoor potty devices.

SUMMARY OF THE INVENTION

In accordance with one embodiment, a pet potty includes a base plate and a grid. The base plate has a base and a wall along the perimeter of the base, the base and wall being impermeable to fluid and forming a cavity capable of retaining fluid. The grid is sized to fit within the cavity of the base plate and has a complex of beams that can support a pet atop the grid. The beams have a top side and a bottom side, and substantially all of the beams are convex in shape on their top side.

In accordance with another embodiment, a pet potty includes a base plate and two or more grids. The base plate has a base and a wall along the perimeter of the base, the base and wall being impermeable to fluid and forming a cavity capable of retaining fluid. The two or more grids are sized to fit within the cavity of the base plate such that when the grids are placed in the cavity the grids are substantially immovable in any horizontal direction. The grids each have a complex of beams that can support a pet atop the grid. The beams have a top side and a bottom side, and substantially all of the beams are convex in shape on their top side.

BRIEF DESCRIPTION OF THE DRAWINGS

These and other features and advantages will be apparent from the following more particular description thereof, presented in conjunction with the following drawings, wherein:

FIG. 4 is a bottom view of one of the grids of the pet potty depicted in FIG. 1.

FIG. 4A is a side view of the grid through lines A-A in FIG. 4.

FIG. 4B is a side view of the grid through lines B-B in FIG. 4.

DETAILED DESCRIPTION

The pet potty systems depicted herein can be used to house-train and act as an indoor potty for dogs and cats. They are, however, particularly suitable for dogs.

Figure 1:
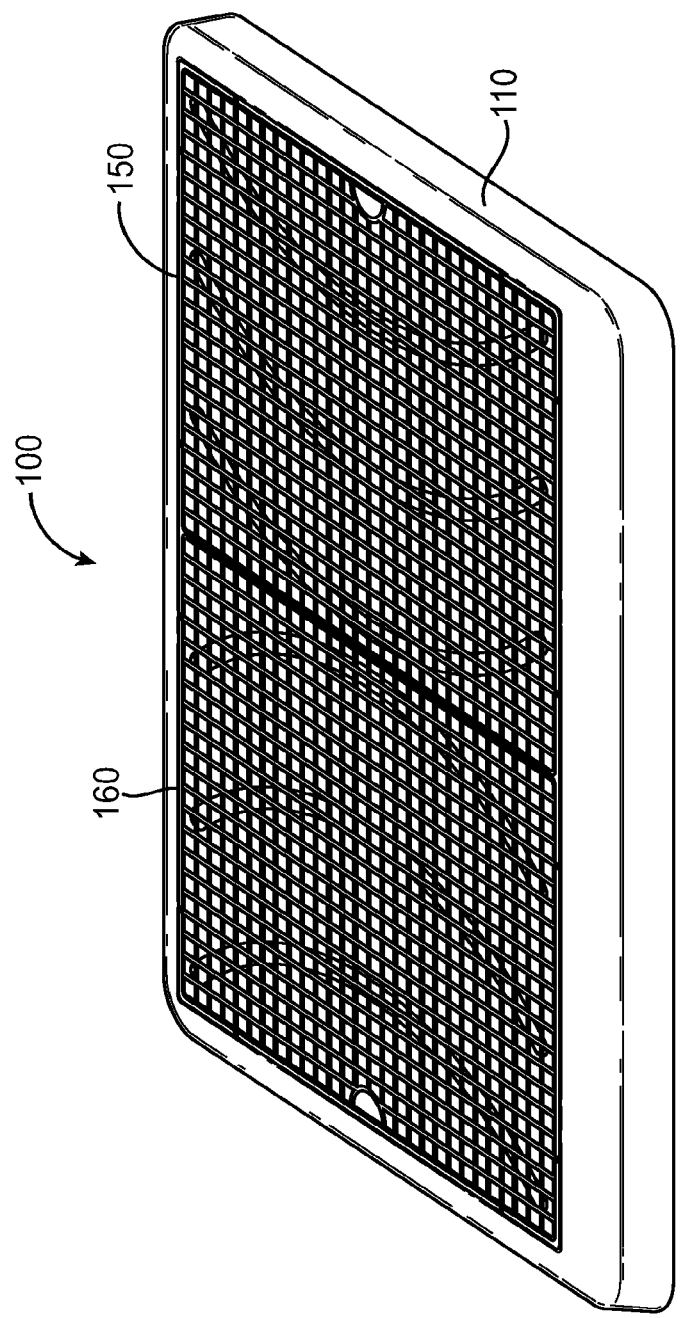
FIG. 1 is a perspective view of a pet potty in accordance with one embodiment.

Turning now to FIG. 1, a pet potty 100 in accordance with one embodiment depicts a rectangular base plate 110 fitted with a double grid system having grids 150 and 160. The grids 150 and 160 are removable from the base plate 110. When the grids 150 and 160 are positioned in the base plate 110 the grids fit snuggly in the base plate such that there is little or no movement in any horizontal direction between the grids 150 and 160 and the base plate 110. The grids are capable of supporting the weight of any breed of dog.

Figure 2:
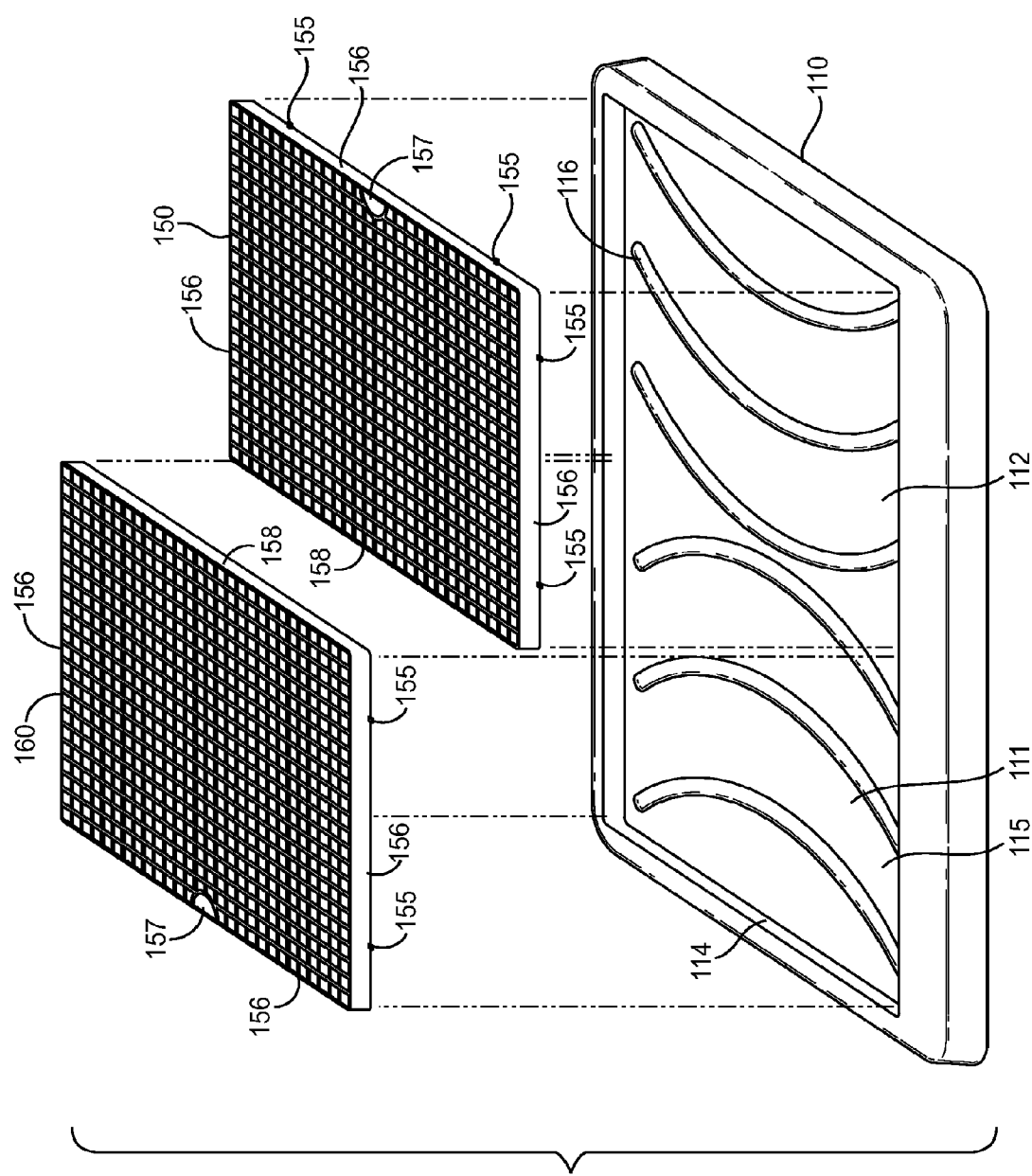
FIG. 2 is an exploded view of the pet potty depicted in FIG. 1.

As shown in FIG. 2, the base plate 110 is formed of a base 111 surrounded on its perimeter by a raised wall 114. A raised wall 114 extending upward from the base 111 forms a cavity 115 in the base plate 110. The wall is preferably about ¾ of an inch tall, but can be from between about ¼ of an inch tall to about 3 inches tall. The grids 150 and 160 fit snuggly within the cavity 115. The grids 150 and 160 can be removed from the base plate 110 by lifting them vertically upward. Finger ports 157 are provided for this purpose and are positioned on the outer sides of each of the grids 150 and 160. The grids 150 and 160 are mirror images of each other. The finger ports 157 are placed on the outer sides of the grids 150 and 160, because there is less likelihood of the outer edges of the grids 150 and 160 being covered with feces.

Figure 3:
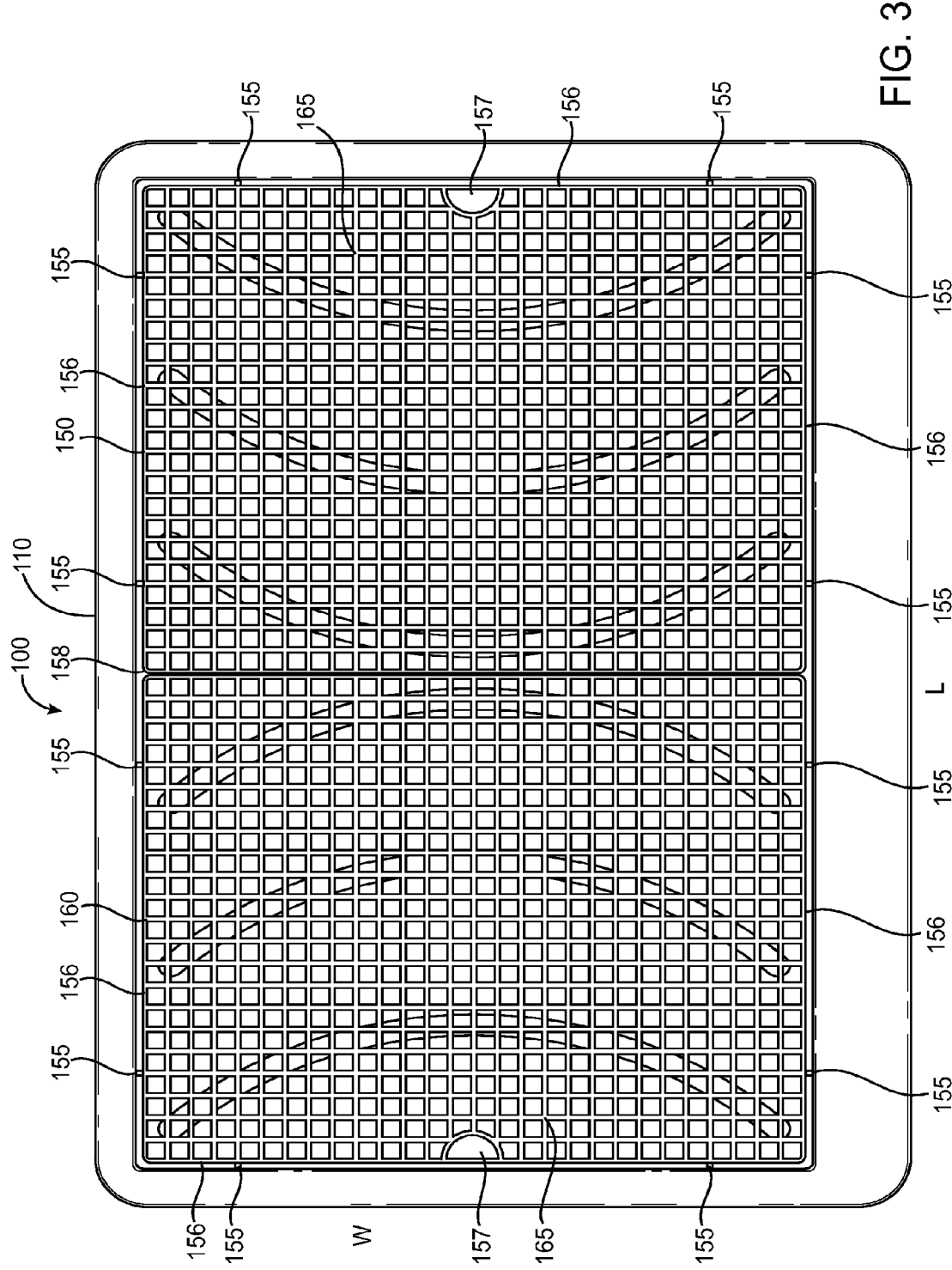
FIG. 3 is a top view of the pet potty depicted in FIG. 1.

The grids 150 and 160 each have a number of spacers 155 along the three outer sides 156 of the grids 150 and 160. There are no spacers along the side 158 of the grids 150 and 160 that touch each other. The spacers 155 form a space between the outer sides 156 of the grids 150 and 160 and the wall 114 of the base plate 110. The spacers 155 ensure that there is no horizontal movement between the grids 150 and 160 and the base plate 110 when the grids 150 and 160 are positioned inside the cavity 111 of the base plate 110. As best shown in FIG. 3, the spacing between the grids 150 and 160 and the wall 114 of the base plate 110 established by the spacers 155 also makes it easier to grip the finger ports 157 with two fingers. Alternatively, the grids can be sized exactly to fit the cavity 115 of the base plate 110. As best shown in FIG. 3, there is no space between the inner sides 158 of the grids, which touch each other.

The base 111 has a plurality of upwardly projecting bumps 116 formed thereon. The bumps 116 are curved, but can be of any shape and size. The bumps 116 help to stabilize the base 111 and prevent it from warping during the manufacturing process or over time.

FIG. 4 depicts grid 150 as an example. Each structure and element of grid 150 is mirrored in grid 160. Grid 150 is formed by a complex of beams 165 that are interconnected within the boundaries of the outer edges 156 and 158 of the grid 150. The beams 165 of grid 150 are supported by edges 156 and 158, which extend downward a distance x from the beams 165 of the grid 150, and by a plurality of columns 170, which also extend downward a same distance x from the beams 165. The distance x is preferably about ¾ of an inch, but can be anywhere from about ¼ of an inch to about 3 inches. There can be as few as one column 170 supporting the beams 165 and as many as fifty columns 170 supporting the beams. Preferably, there are at least five columns 170 supporting the beams, as shown in FIG. 4.

As best shown in FIGS. 4A and 4B, the beams 165 have a top side 167 and a bottom side 168. The bottom side 168 of the beams 165 do not extend downward the same distance x as the columns 170 and edges 156 and 158 of the grid 150. Therefore, the bottom side 168 of the beams 165 do not touch the base 111 of the base plate 110 (both shown in phantom in FIGS. 4A and 4B).

Figure 5:
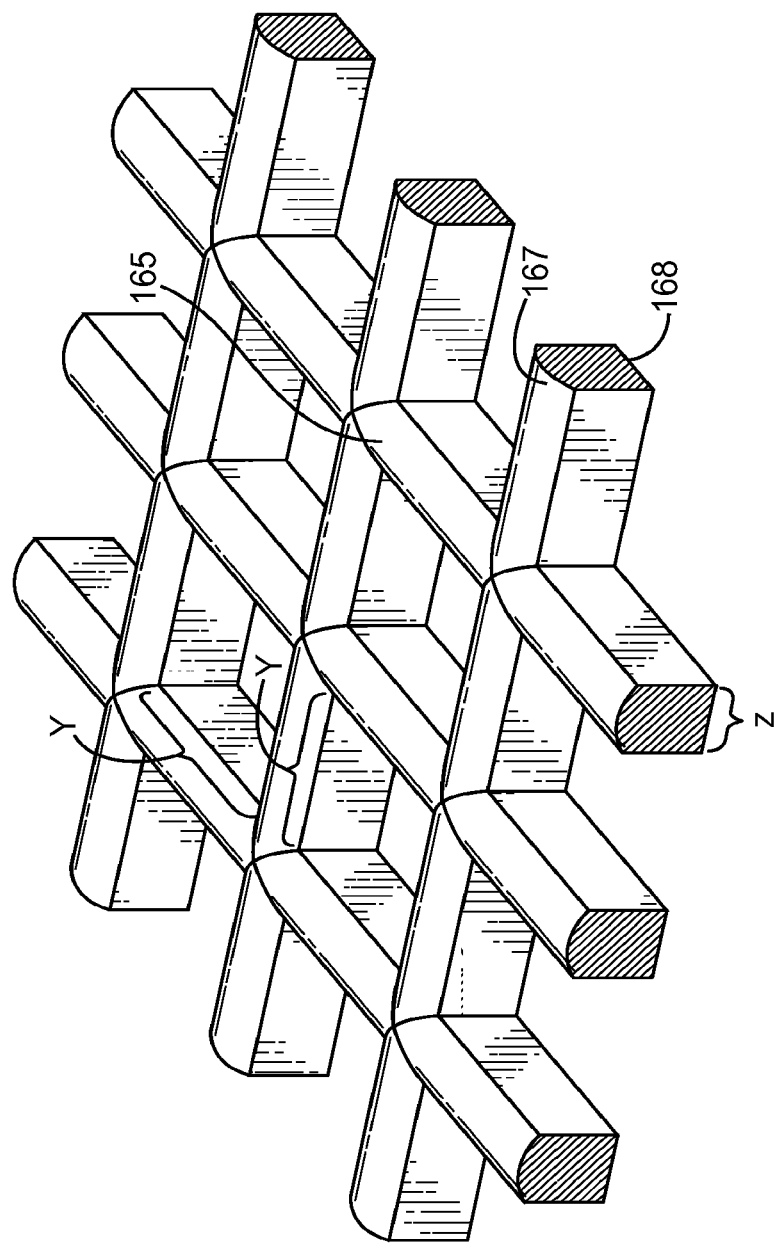
FIG. 5 is a three-dimensional close-up view of a portion of the grid depicted in FIG. 4.

As best shown in FIGS. 4A and 5, the bottom side 168 of the beams 165 can be flat, concave, convex, or any shape. The top side 167 of the beams 165 can be convex (i.e., slightly rounded) in shape. The convex shape of the top side 167 of the beams 165 helps to cushion the paw pads of dogs and cats. The beams 165 are at least 0.15 inches thick (as shown in distance z in FIG. 5), which further ensures the safety and comfort of dogs' and cats' paw pads. As shown in FIG. 5, there are holes or openings between the beams, and the beams 165 are separated by a distance y across the openings between the beams 165. This distance y between the beams 165 is preferably no greater than about ⅜ of an inch. In any case, distance y is less than ⅝ of an inch. The small distance between the beams reduces the risk that the smallest paw pads of the smallest dog breeds gets stuck inside of the openings between the beams 165 rather than being supported atop the beams 165.

Figure 7A:
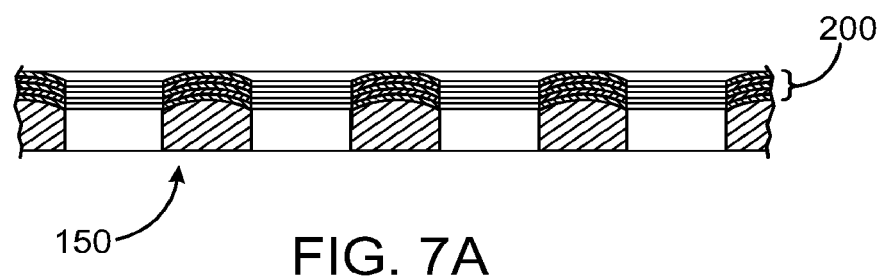
FIG. 7A shows a side cut-out view of one of the grids of the pet potty depicted in FIG. 1 with a series of disposable layers adhered to the grid.
Figure 7B:
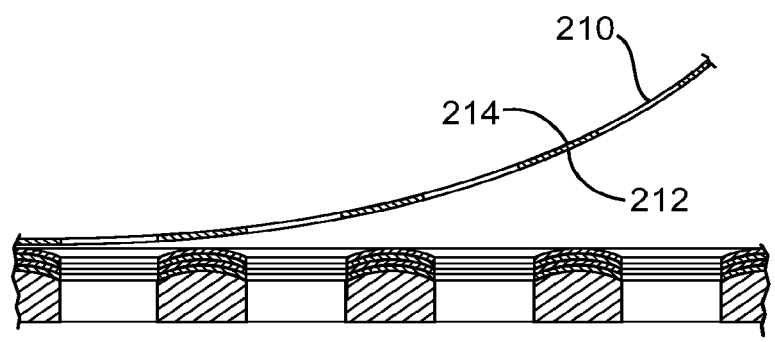
FIG. 7B shows one of the disposable layers of FIG. 7A being peeled off the grid.
Figure 8:
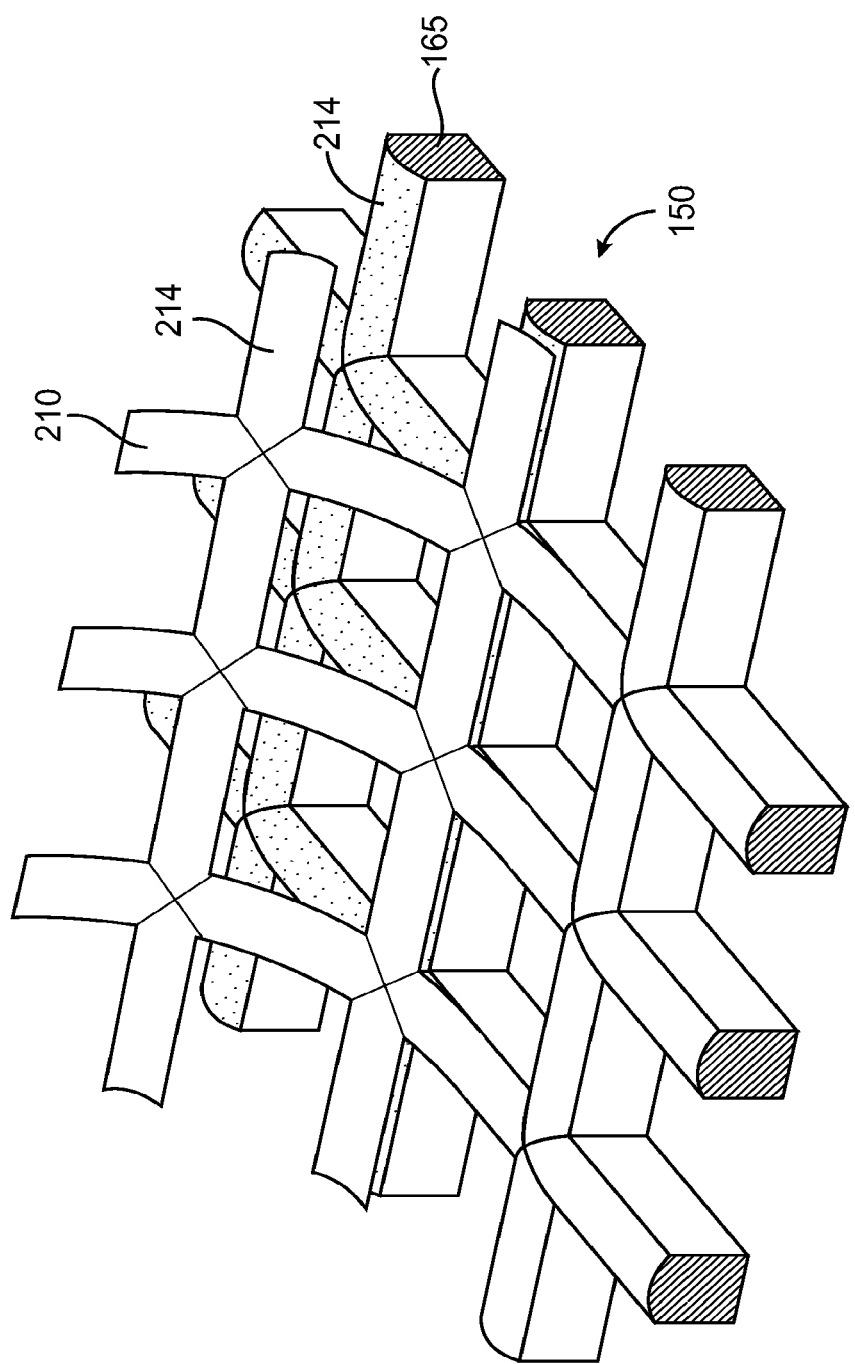
FIG. 8 shows a three-dimensional close-up view of a portion of the grid depicted in FIG. 4 with one of the disposable layers depicted in FIGS. 7A and 7B being peeled off the grid.

An additional feature of the pet potty 100 can be a series 200 of protective disposable layers of material 210 adhered atop the grids 150 and 160. This feature is best shown in FIGS. 7A, 7B and 8. Each disposable layer 210 is made of at least one layer having adhesive material on the bottom side 212 and non-adhesive material on the top side 214. Alternatively, each disposable layer 210 can be made of two layers of material, a top layer 214 and a bottom layer 212. The top layer 212 does not have an adhesive, and the bottom layer 214 has an adhesive. The bottom layer 214 (or bottom side) of each disposable layer 210 adheres to the top layer 212 (or top side) of the disposable layer 210 below it. As shown in FIGS. 7B and 8, each disposable layer 210 can be periodically removed after it is soiled by the pet revealing a clean disposable layer 210 below it. The series of protective disposable layers 200 can be provided in packets of two, three, four, five, six, seven, eight, nine, ten, or more disposable layers 210. The series of disposable layers 200 preferably has the same general shape and dimensions of the grids 150 and 160 and the length and width of each adhesive layer 210 of the series of disposable layers 200 is generally the same as the beams 165 of the grids 150 and 160.

The pet potty 100 is depicted in the figures as being rectangular, but it can be round, oval, square, or any shape that provides enough space for a dog or cat to sit atop and relieve herself or himself. For example, it can be shaped like a bone or a fire hydrant or any other fanciful shape. In one embodiment, such as that shown in the figures herein, the pet potty 100 is about 19 inches in width (shown as W in FIG. 3) by about 26 inches in length (shown as L in FIG. 3), and the cavity 115 or elimination space can be about 16 inches in width by about 24 inches in length. In other rectangular embodiments, the pet potty 100 can be about 14 inches in width and 19 inches in length with a cavity or elimination space of about 12 inches in width and 15.5 inches in length.

The grids 150 and 160 can also be of any size or shape. In the embodiment shown in the figures, the grids can be about 12 inches in length by about 16 inches in width each. In yet another embodiment (not shown in the figures), the pet potty can have one large single grid that is about 24 inches in length by about 16 inches in width, rather than having a double grid system such as that shown in the figures.

Figure 6:
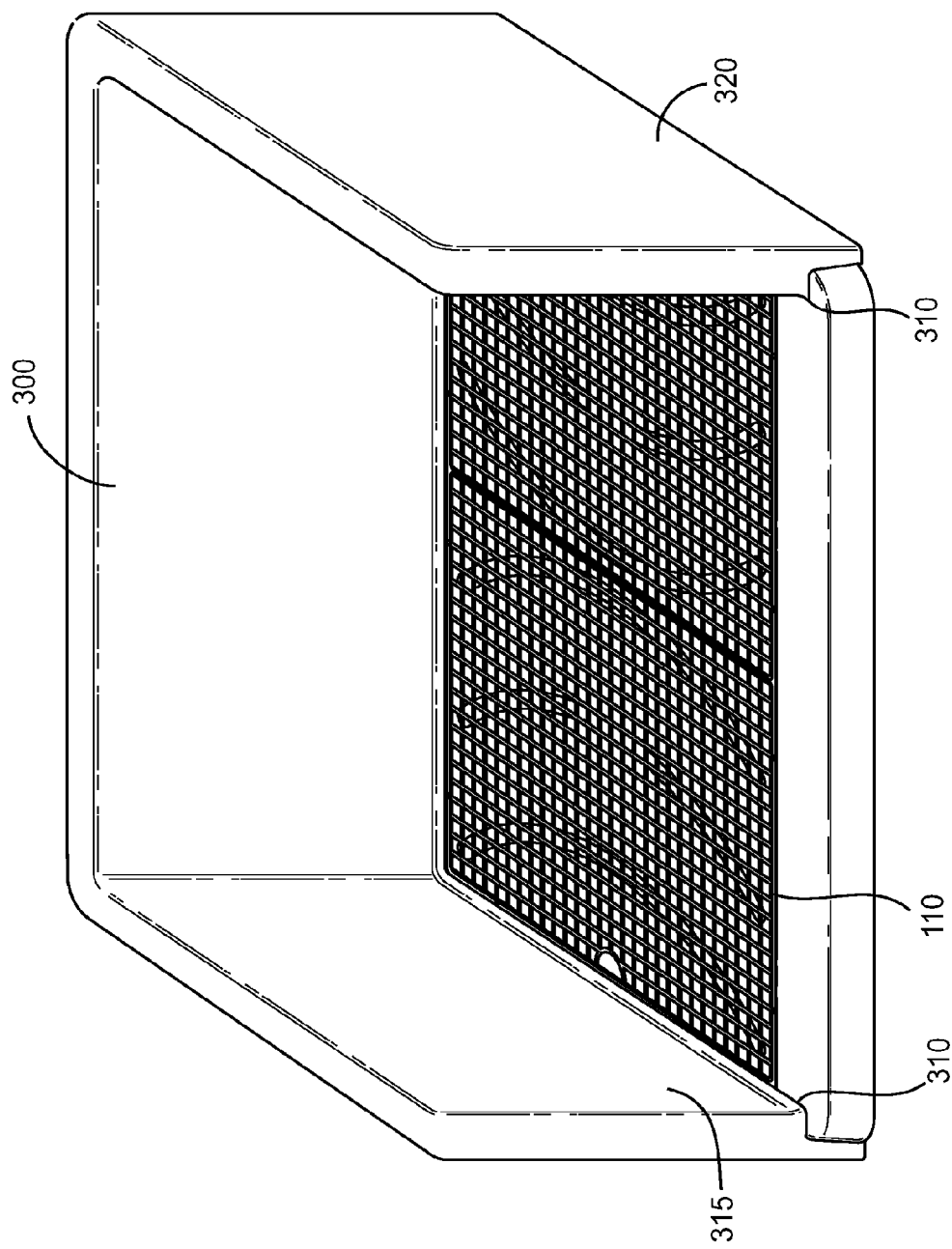
FIG. 6 is a perspective view of the pet potty depicted in FIG. 1 with a raised drainage attachment.

As shown in FIG. 6, the pet potty 100 can be fitted with a raised drainage attachment 300. The raised drainage attachment 300 can best be utilized by male dogs that raise their legs when they urinate. The drainage attachment 300 can have three walls, leaving an opening along one of the long sides of the pet potty 100 so that the dog has a way to get on the pet potty. Alternatively, the raised drainage attachment 300 can have just one wall, preferably along one of the long sides of the pet potty 100. The three walls of the drainage attachment 300 can be of a unibody construction made from a single mold. Alternatively, the drainage attachment 300 can be constructed by attaching the three walls together through various types of attachments that are known in the art. Each wall of the drainage attachment 300 has an internal side 315 facing the pet potty 100, and an external side 320 facing outward and away from the pet potty 100. The bottom edge of the internal side 315 of the walls forms a drainage lip 310. The drainage lip 310 extends laterally inward toward the cavity 115 of the base plate 110 of the pet potty 100. The drainage lip 310 extends just over the internal edge of the perimeter wall 114 of the pet potty such that fluid that drains down the internal walls of the drainage attachment 300 flows into the cavity 115 of the base plate 110 of the pet potty 100. A retention lip (not shown) can extend inwardly from the bottom edge of the external wall 320 and under the bottom of the base plate 110. The retention lip can be used to firmly secure the drainage attachment 300 to the pet potty 100. The drainage attachment 300 can be attached to the pet potty 100 by sliding the pet potty into the groove formed between the bottom of the drainage lip 310 and the top of the retention lip (not shown). The height of the drainage attachment 300 can be any height between about four inches and about twenty-four inches, preferably between about twelve inches and about eighteen inches, and preferably about sixteen inches.

Although illustrative embodiments of the present invention have been described herein in connection with the accompanying drawings, it is to be understood that this invention is not limited to these embodiments and that various changes and modifications may be effected therein by those skilled in the art without departing from the spirit of the invention.

I claim:

1. A pet potty comprising:
   a base plate consisting of a base and a wall along the perimeter of the base, the base and wall impermeable to fluid and forming a cavity capable of retaining fluid, wherein the base plate is made of a unibody construction;
   two or more grids that are sized to fit within the cavity of the base plate such that when the grids are placed in the cavity horizontally adjacent one another the grids are substantially immovable in any horizontal direction and the grids are in direct contact with one another, each grid comprises a complex of beams that can support a pet atop the grid, wherein the beams have a top side and a bottom side, and wherein substantially all of the beams are convex in shape on their top side;
   a first series of two or more protective disposable layers of flexible material adhered to the top of one of the two or more grids; and does not block openings in the two or more grids; and
   a second series of two or more protective disposable layers of flexible material adhered to the top of the other of the two or more grids; and does not block openings in the two or more grids; and
   wherein the first and second series of two or more protective disposable layers of flexible material configured to be peeled off and removed, revealing another of the two or more protective disposable layers of flexible material below it.

2. The pet potty of claim 1, wherein the bottom side of the beams do not touch the base when the grids are positioned in the cavity of the base plate.

3. The pet potty of claim 2, wherein the beams of the grids are supported by a plurality of columns that extend downward from the bottom side of the beams toward the base, and wherein the columns touch the base when the grids are positioned in the cavity of the base plate.

4. The pet potty of claim 1, wherein the beams of the grids are supported by a plurality of columns that extend downward from the bottom side of the beams toward the base, and wherein the columns touch the base when the grids are positioned in the cavity of the base plate.

5. The pet potty of claim 1, wherein each grid comprises a finger port along an edge of the grid for removing the grid from the base plate.

6. The pet potty of claim 1, wherein each grid comprises a plurality of spacers extending laterally from the grid, wherein the spacers space the grid a distance from the wall of the base plate.

7. The pet potty of claim 1, wherein the complex of beams form openings between the beams, and wherein the openings are no more than ⅜ of an inch across the opening.

8. The pet potty of claim 7, wherein the openings are round, elliptical, or polygonal.

9. The pet potty of claim 1, further comprising a raised wall around part of the perimeter of the base plate.

10. The pet potty of claim 9, wherein the raised wall has a drainage lip that extends laterally from the raised wall toward the cavity of the base plate, such that when fluid drains down the raised wall, it drains into the cavity from the drainage lip.

11. The pet potty of claim 1, wherein the beams are at lest about 0.15 inches thick such that when a dog is atop the grids, the beams cushion the dog's paw pads.

\* \* \* \* \*